Dec. 9, 1958 R. C. GIESSE 2,863,590
COFFEE MAKER
Filed Nov. 2, 1955 3 Sheets-Sheet 1

INVENTOR.
ROBERT C. GIESSE
BY
ATTORNEYS

Dec. 9, 1958     R. C. GIESSE     2,863,590
COFFEE MAKER
Filed Nov. 2, 1955     3 Sheets-Sheet 2
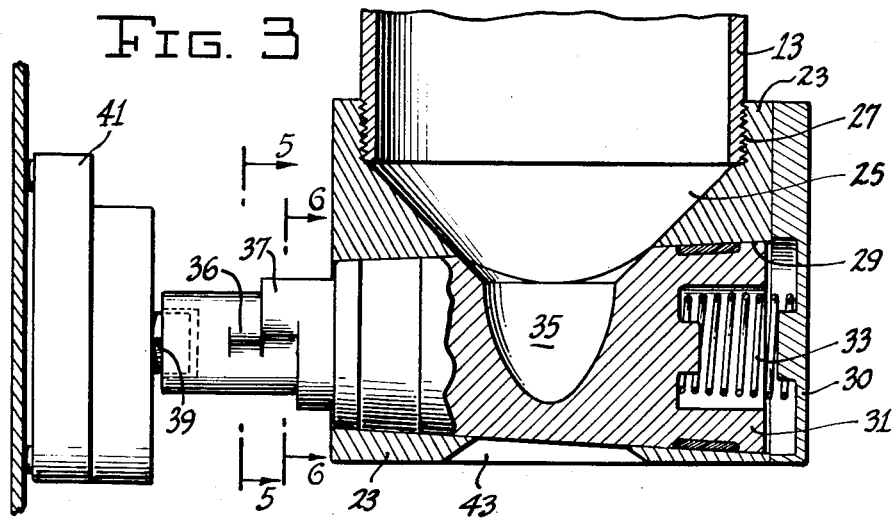
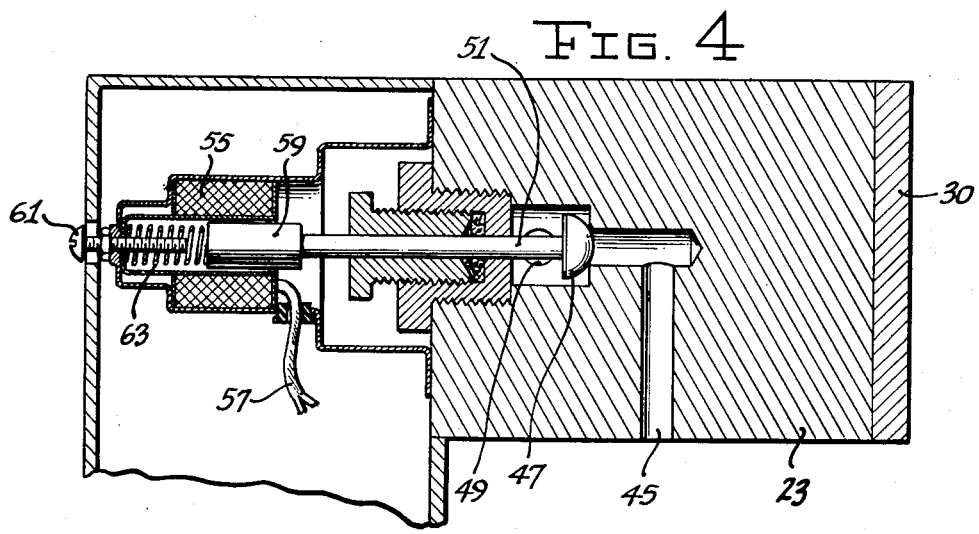
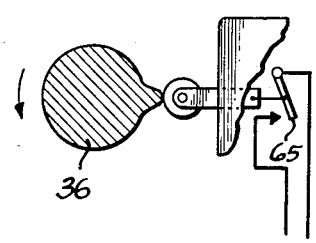
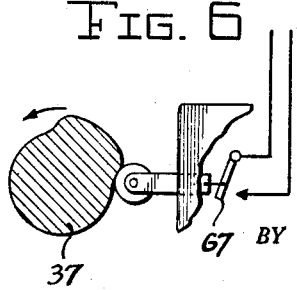
INVENTOR.
ROBERT C. GIESSE,
BY
Eckhoff and Slier
ATTORNEYS.

Dec. 9, 1958 R. C. GIESSE 2,863,590
COFFEE MAKER
Filed Nov. 2, 1955 3 Sheets-Sheet 3

INVENTOR.
ROBERT C. GIESSE
BY
ATTORNEYS.

United States Patent Office 2,863,590
Patented Dec. 9, 1958

2,863,590

COFFEE MAKER

Robert C. Giesse, Palo Alto, Calif., assignor to Tri-Tek Inc., a corporation of California Application November 2, 1955, Serial No. 544,533

2 Claims. (Cl. 222—129.4)

This invention relates to a dispenser for instant soluble products. The dispenser of the present invention may be used for various purposes such as the preparation of coffee from soluble coffee powder, the preparation of soups, chocolate drinks, and the like and is particularly suitable for use with hygroscopic powders. However, for convenience, the invention will primarily be described in terms of the dispensing of soluble coffee powder and hot water for the preparation of a coffee beverage.

It is an object of the present invention to provide a dispenser which is simple in structure and which is foolproof in operation.

Another object of the present invention is to provide a dispenser wherein measured amounts of water and solids are combined and wherein there is no opportunity for the water to contaminate the measuring device and cause it to become contaminated in any way.

Another object of this invention is to provide a dispenser having a novel liquid heater which operates at a low coil temperature and which does not require a pressure release valve.

A further object is to provide a device wherein water vapor or condensate has little opportunity to contaminate measuring device or contents of solids reservoir.

Other objects and advantages of the invention will be apparent from the balance of the specification, as follows.

In the drawings forming a part of this application:

Figure 3 is a sectional view on the lines 3—3 of Figure 1.

Figure 4 is a sectional view on the lines 4—4 of Figure 1.

Figure 5 is a sectional view on the lines 5—5 of Figure 3.

Figure 6 is a sectional view on the lines 6—6 of Figure 3.

Figure 1:
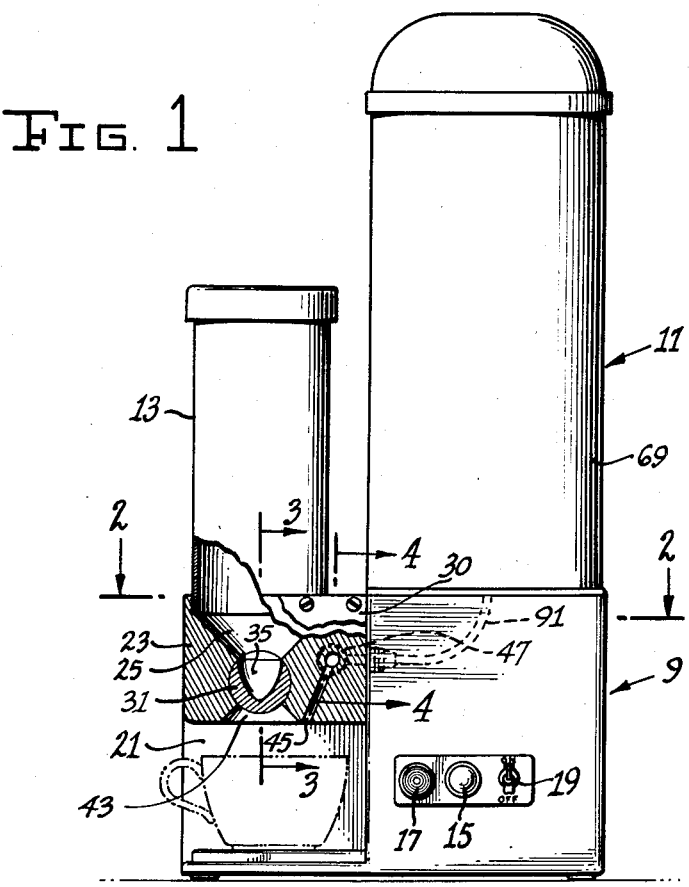
Figure 1 is a front elevational view of the device of the present invention with certain parts cut away for clarity of illustration.
Figure 2:
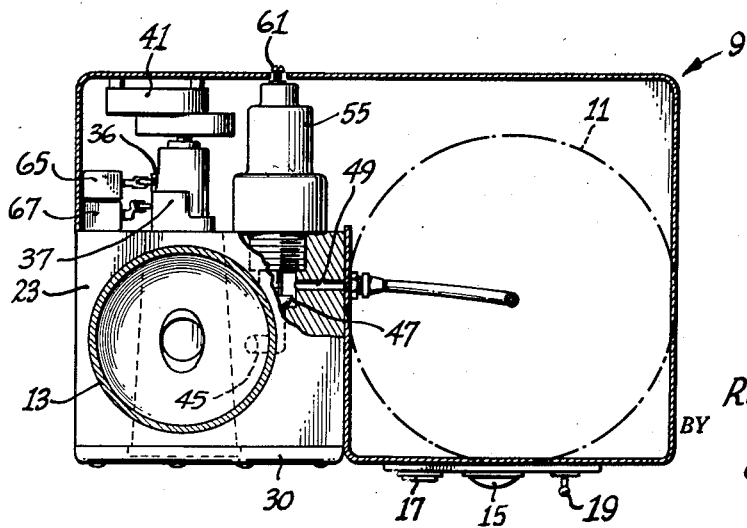
Figure 2 is a plan section view on the lines 2—2 of Figure 1.
Figure 7:
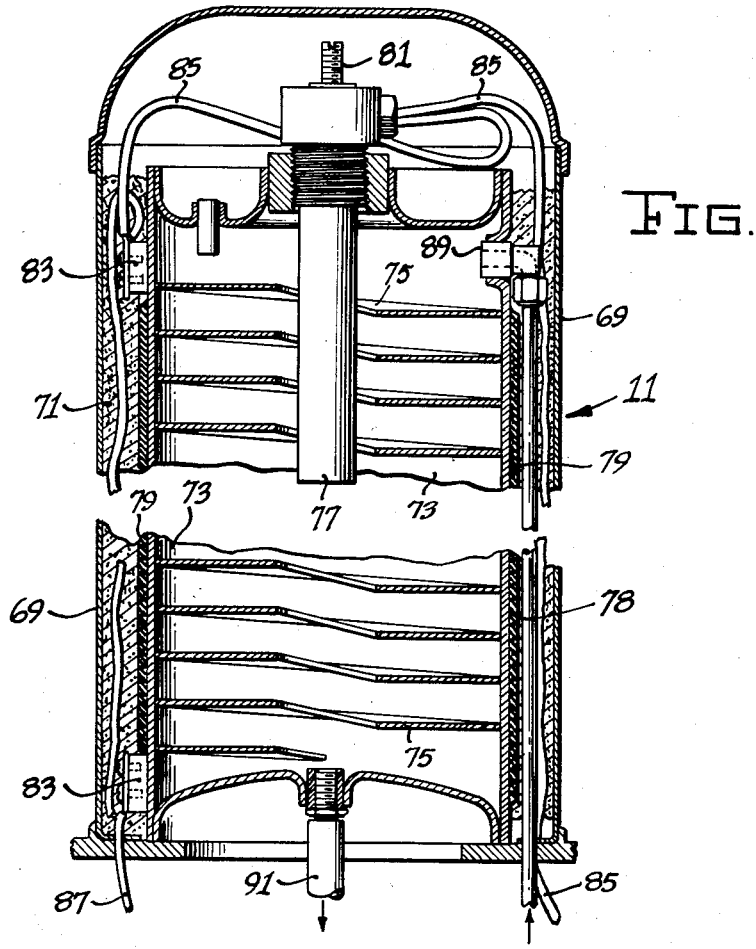
Figure 7 is a sectional view through the center of the water heater.

Referring now to the drawings by reference characters, there is shown a dispenser having a base portion generally designated 9. Mounted on the base portion is a water heater, generally designated 11, and a hopper 13 for the soluble product, such as coffee. Mounted on the front of the base portion 9 is an indicator light 15, a cycle switch 17, and an on-and-off switch 19. The base portion contains a recess 21, which is adapted to receive a coffee cup, or other suitable receptacle. Mounted on the base portion 9, directly over the recess 21 and attached to the container 13, is a dispensing head which has been generally designated 23. The dispensing head 23 has therein a conical opening 25 at the top, forming a typical bin-like structure. The conical opening 25 terminates in threads 27, which are adapted to screw onto the hopper 13. At right angles thereto, a second conical opening 29 is provided which is fitted with a conical plug 31, the conical plug being held tight against the opening 29 by means of the spring 33 acting against the cap 30. For cleaning, the cap 30 can be removed, allowing the plug 31 to slip out. Preferably, the members 23 and 31 are made of plastic materials. The plug-like member 31 has therein a recess 35, which serves as the measuring device for the solid material. The plug 31 also has two cams, designated 36 and 37, thereon, and is connected through shaft 39 to a motor or other turning means 41. Directly under the plug 31 is a cutaway portion 43 for permitting materials measured in the recess 35 to fall freely away from the block 23. Adjacent the recess 43 is a passageway 45, which leads from the dispensing valve, designated 47. The valve 47 has an inlet pipe 49 and a plunger member 51, which seats against the line leading to passageway 45. The plunger 51 is actuated by the solenoid 55, which has suitable wiring 57 leading thereto. The plunger 51 fits onto an armature 59, which is adapted to move inside the field of the solenoid. The length of the stroke through which the armature 59 can move may be regulated by the screw 61 so that by turning the screw 61, one can secure any desired degree of opening of the valve. A spring 63 is provided to keep the valve in a normally closed position so that unless the solenoid 55 is energized, the valve will remain closed.

Two switches, designated 65 and 67, are connected through suitable cam followers to the cams 36 and 37 respectively.

The water heater, which has been generally designated 11, is of a novel design in that it employs low temperature heater elements together with an internal spiral ribbon type fin which permits the use of a low temperature heating element and thus avoids the necessity of a pressure relief valve or other over-heating protection beyond that provided by a thermostat. The heater consists of an outside shell 69, which contains a suitable insulating material 71, and an inner shell or tank proper 73. Inside the tank 73 there are a series of fins 75. The fins 75 are bonded to the shell 73, but a space is left centrally for insertion of the thermostat 77. The thermostatic element is of conventional design and may be adjusted by means of the screw 81, for the regulation of temperature. The thermostat 77 is connected to the heating coil 79 at terminal blocks 83, and serves to maintain the desired temperature. Suitable wiring 85 is provided for supplying power to the thermostatic element 77 and heater 79, and also additional wiring 87 is provided for actuating the indicator light 15. The inlet 89 to the tank 73 is at the top, while the outlet 91 is at the bottom. The heating coil 79 is made of resistance wire embedded in a suitable insulating material 78 having good thermal conductivity and high dielectric properties.

Figure 8:
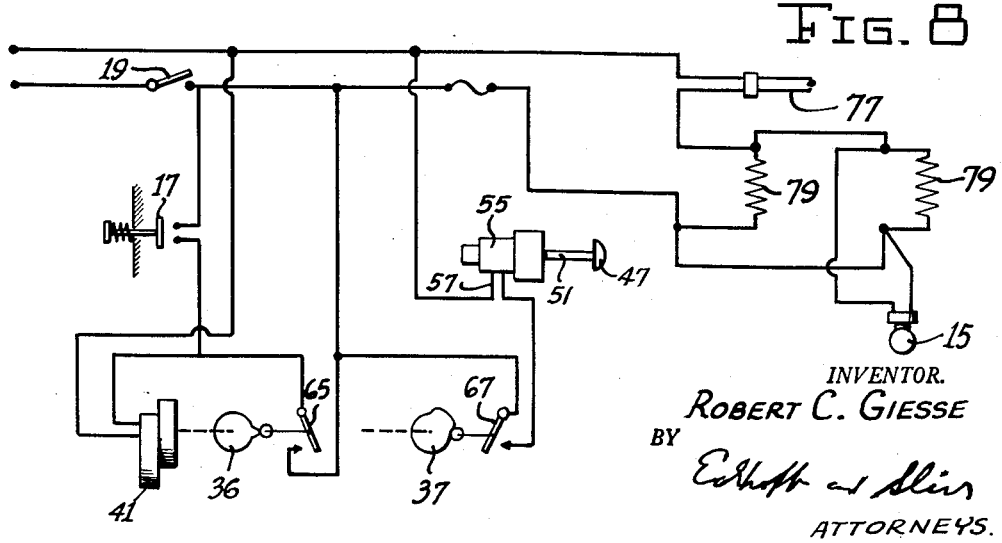
Figure 8 is a schematic view of the control devices of the present invention.

The operation of the device can best be understood by reference to the schematic diagram, Figure 8. The switch 19 is a conventional on-and-off switch, and this switch must be turned on before any part of the device is operative. Preferably, the switch 19 is turned on a substantial length of time before one desires to use the device, so that the water may become hot. This energizes the heating element 79 and one can tell when the operating temperature has been reached by waiting until the pilot light 15 goes out. When one wishes to prepare a beverage, it is only necessary to push the momentary contact switch 17 for an instant. When switch 17 is closed, the motor 41 is energized, turning the cam 36 slightly so that the switch 65 is closed. The switch 65 parallels the switch 17, so that it is not necessary to hold down the switch 17. As the motor continues to run, the plug member 31 turns from its upright position and the chamber 35 picks up one measure of soluble coffee. As 31 revolves through 180°, it discharges the powder into a cup or other container waiting in the recess 21. As the member 31 continues to revolve, it soon reaches sealing contact with the walls of member 23 and as soon as the chamber 35 has become sealed, cam 37 has rotated into a position wherein its hump closes the switch 67. This in turn energizes the solenoid 55, opening the valve 47 and permitting liquid to flow into the cup. The amount of liquid can be regulated by setting the screw 61. As the cup is filled, the hump on cam 37 passes, closing valve 47 and the hump on cam 35 again contacts the switch 65, causing this switch to open and stopping the motor, leaving the parts in position for a repetition of the cycle. Of course, the action of the thermostat maintains the correct water temperature, so that after the first cycle is complete, further operation of the device does not require a waiting period.

It is believed apparent from the above description that I have provided a simple and effective dispenser and solubilizer for instant products, which is simple yet effective in operation.

Although the operation of the device has been described with a motor 41, it is obvious that the same principles might be used with a hand actuated device for turning the cams and measuring device. It is also apparent that the exact form of water heater shown does not need to be employed, but that any other suitable heater may be used instead. The plug 31 and head 23 are preferably made of non-wetting plastic which is heat resistant and which has low friction such as tetrafluoroethylene polymers (Teflon) or the like.

I claim:

1. In a dispenser for a powdered water soluble food material wherein separate powder and hot water reservoirs are provided, the improvements comprising: a dispensing head mounted below said powder reservoir, said dispensing head having a frusto-conical chamber therein and an orifice on the underside thereof communicating with said chamber; a rotatable frusto-conical plug mounted within said frusto-conical chamber; means for urging said frusto-conical plug into intimate contact with the walls of said chamber, said plug having a chamber therein beneath said powder reservoir and normally in communication with the interior thereof whereby when said chamber is in an upright position, said chamber will be filled with a measured amount of said water soluble powder; a drive shaft secured to one end of said plug; means for turning said drive shaft and thereby rotating said plug; a conduit terminating at a point adjacent said dispensing head orifice and communicating with said hot water reservoir; a valve positioned in said conduit; and means for opening said valve for a predetermined period of time at a point after said plug has been rotated sufficiently to discharge through said dispensing head orifice said measured quantity of powder from said plug chamber.

2. The structure of claim 1 wherein said drive shaft on said plug is provided with two cams, one of said cams controlling the rotation of said plug and the other of said cams opening and closing said valve on said hot water conduit.

References Cited in the file of this patent

UNITED STATES PATENTS

| | | |
|---|---|---|
| 841,111 | Bromley | Jan. 15, 1907 |
| 879,000 | Pitner | Feb. 11, 1908 |
| 1,077,160 | Reese | Oct. 28, 1913 |
| 1,205,088 | Fietsch | Nov. 14, 1916 |
| 1,671,677 | Keeton | May 29, 1928 |
| 2,220,605 | Kreisberg | Nov. 5, 1940 |
| 2,243,058 | Wysong | May 20, 1941 |
| 2,252,541 | Arnold | Aug. 12, 1941 |
| 2,339,908 | Brewer et al. | Jan. 25, 1944 |
| 2,452,933 | Joppich et al. | Nov. 2, 1948 |
| 2,519,920 | Miner | Aug. 22, 1950 |
| 2,567,282 | Gardner et al. | Sept. 11, 1951 |
| 2,569,486 | Mills | Oct. 2, 1951 |
| 2,585,198 | Warren | Feb. 12, 1952 |